Patented Aug. 29, 1950

2,520,850

UNITED STATES PATENT OFFICE 2,520,850

PROCESS OF WHITENING ALKALINE EARTH CARBONATES

Leonard John Minnick, Cheltenham, Pa.

No Drawing. Application February 12, 1944,
Serial No. 522,158

17 Claims. (Cl. 23—66)

The present invention relates to a process for whitening or bleaching the carbonates of the alkaline earths to render them substantially colorless and more particularly, it relates to the production of a substantially white alkaline earth carbonate in which the ferric iron which was originally contained in such quantities to cause discoloration thereof has been converted to a compound imparting substantially no coloration to the alkaline earth product.

Most natural alkaline earth carbonates occur combined with iron, and this iron imparts to them a yellowish, brownish, and sometimes bluish color. There are other impurities associated generally with the natural occurring carbonates such as silica and alumina, but the chief cause for the discoloration of these materials is the iron. The discolored material is objectionable, however, for many uses; thus, paints, linoleum fillers, special types of rubber, toothpaste, face powders, and the like, all require for some of their specific uses a very white product.

One of the objects of the present invention is to provide a simple and economic process in which discolored alkaline earth carbonates may be rendered substantially white.

Another object of the invention is to provide a process by which discolored naturally occurring alkaline earth carbonates, after conversion to a precipitated form, can be treated so that the precipitated product may be rendered substantially white.

A further object of the invention is to provide a process by which chemically produced alkaline earth carbonates, prepared from other than natural forms of carbonate, may be rendered substantially white.

Another object of the invention is to provide a process by which alkaline earth carbonates discolored by ferric iron may be rendered substantially colorless by the addition of a suitable reagent which will convert the ferric iron into a compound imparting substantially no discoloration to the alkaline earth product.

A further object of the invention is to provide a process by which a substantially white product may be prepared from the waste calcium carbonate sludge obtained as a by-product in various processes of obtaining magnesia from dolomite.

Other objects, including the production of a novel alkaline earth carbonate product in which at least a portion of the ferric iron has been converted into a compound imparting substantially no coloration to the product, will be apparent from a consideration of the specification and claims.

The process of the present invention is applicable for the whitening of various alkaline earth carbonates and the term "alkaline earth carbonate" as used herein includes the carbonates and basic carbonates of calcium, strontium, barium, and magnesium.

The alkaline earth carbonate treated is a chemically produced alkaline earth carbonate obtained from any source. Thus, it may be obtained by the calcination, hydration, and carbonation of any natural alkaline earth carbonate; by the hydration and carbonation of any alkaline earth oxide; by the carbonation of any alkaline earth hydrate; or by the carbonation or precipitation by the use of carbonate ions in solution of any alkaline earth salt in an aqueous solution. For example, the chemically produced carbonate may be obtained by the calcination, hydration and carbonation of limestone, dolomite, magnesium limestone, magnesite, witherite, and the like, or by the hydration and carbonation of quicklime, or by the carbonation of a commercial hydrated lime, dolomite or brucite. Furthermore, the precipitated pigments and fillers may be treated, such as whiting, magnesium alba, and the like. The invention is also applicable for the treatment of the precipitated calcium carbonate by-product as obtained from various processes for the separation of magnesia from dolomite, for example, the Clossen process, the Pattinson process, and the process described in my copending application Serial No. 536,200, filed May 18, 1944, now Patent No. 2,434,710. Soluble salts, such as magnesium bicarbonate which is associated with the calcium carbonate sludge obtained in the Pattinson process, may be present with the carbonate at the time of the treatment. The term "chemically produced alkaline earth carbonate" includes all carbonates which are produced by chemical reaction as distinguished from native forms of alkaline earth carbonate ores.

Heretofore, the so-called whitening of alkaline earth carbonates either native or in chemically produced form has been performed by treating the material with an addition agent designed to mask the material in a purely physical manner and tending to reduce the discoloration. Such coatings may be organic such as a wax, or may be inorganic such as aluminum hydroxide gel, or may be a pigment of high hiding power. If products of this type are ground or subjected to various physical or chemical treatment such as usually encountered in pigmenting materials the physical film is destroyed and the resulting color of the product is substantially the same as the untreated material.

The present invention is to be contrasted with these attempts since in accordance herewith the ferric iron which in very small percents, even in tenths of a percent, causes discoloration of the alkaline earth carbonate before treatment, is converted into a compound imparting substantially no coloration to the product.

Tests have indicated that, irrespective of the fineness of grinding of native carbonate and the extent of treatment, no noticeable reduction in the discoloration takes place; however, when this same discolored natural carbonate is calcined, hydrated, and then carbonated, and thereafter subjected to the action of the reagents, the resulting product can be easily converted so that the discoloration evident in the original carbonate is either completely, or substantially completely, removed. From this, it will be seen that by taking a natural alkaline earth carbonate which is discolored, and calcining it, hydrating it, and precipitating it by carbonation, the iron has been made available to the hereinafter mentioned reducing agents. By the process of the present invention, therefore, a naturally occurring alkaline earth carbonate containing sufficient iron to discolor it may be treated to render it substantially white. In addition, the process is applicable and works equally well if the chemically produced carbonate has been formed from other than a naturally occurring material.

The process involves the treatment of the carbonate with a compound selected from the group consisting of reducing acids and reducing salts and may be an inorganic compound of this group which does not impart coloring material to the product and is not converted to a compound coloring the product, such compound being hereinafter referred to as a "non-color-imparting inorganic reducing agent selected from the group consisting of reducing acids and reducing salts capable of reducing ferric iron to ferrous iron." The aqueous medium in which the treatment takes place is of insufficient acidity to cause appreciable decomposition or solution of the alkaline earth carbonate. The term "reducing agent" includes a large number of compounds, it being only necessary to mention a few of the group such as a sulphite, an arsenite, a thiosulphate, a hydrosulphite, a phosphite, a hypophoshite, a stannous salt, a mercurous salt, and potassium cyanide. The reducing cation may be added in the form of any appropriate salt. Obviously, the compound containing a reducing anion may be employed as the acid, or in the form of a water-soluble salt, such as the alkali metal (sodium, potassium) salt, or as a substantially water-insoluble salt, such as any suitable alkaline earth metal or heavy metal salt. Of the compounds having a reducing anion, the use of a sulphite is preferred, the bisulphites being included herein within the term "sulphites." The sulphite ion is advantageously provided by the passage of sulphur dioxide gas into the water in which the carbonate is suspended to provide sulphurous acid. When a salt containing a reducing anion is employed, the cation of the salt is preferably the same as that of the carbonate being treated. Thus, a calcium salt will advantageously be used with calcium carbonate, and hence a minimum amount of extraneous material will be added to the whitened product. Furthermore, it is preferred to use a salt having a cation which produces insoluble salts. The reducing agent, the carbonate, and the water may be brought together simultaneously or in any order, and the reducing agent may be supplied as a dry solid, as a solution, or as a gas.

The amounts of the compound selected from the group consisting of reducing acids and reducing salts, based on the weight of the alkaline earth carbonate, may be small since the iron to be converted is usually present in very small amounts. In any particular case, it will be desirable to add sufficient reducing compound to convert substantially all the ferric iron into a substantially colorless compound, but even if smaller amounts than those required for complete reaction are employed, a whitening effect to the extent of the conversion is obtained, and in some instances, this may be sufficient. The amount of compound required in any particular case will depend upon the amount of iron which it is desired to convert into the substantially colorless compound and the efficiency of contact between the chemically produced alkaline earth carbonate and the reducing compound. In general, the amount required if maximum efficiency of contact is afforded will be 1% or less. Thus, an alkaline earth carbonate containing 0.4% of iron has been rendered substantially colorless by the use of 0.2% to 0.5% sulphur dioxide under conditions resulting in the conversion of the iron into a substantially colorless compound. In a typical case using sodium thiosulphate as the reducing agent, the amount of thiosulphate pentahydrate employed will generally be between 0.5% and 1% in the treatment of alkaline earth carbonate containing approximately 0.4% of $Fe_2O_3$. It will, of course, be understood that equivalent amounts of other compounds selected from the group consisting of reducing acids and reducing salts may be employed. The use of an excess of the compound over that required does not deleteriously affect the product, and it is to be understood that any amount desired may be employed in spite of the fact that the excess may constitute a waste of material.

The action of the reducing agent on the chemically produced alkaline earth carbonate results in a reaction involving the ferric iron impurity. In some instances, the compound formed will be a complex salt or a double salt of the alkaline earth material, the ferric iron impurity, and the reducing agent, and in some cases iron will be present in the reduced state, but the compound formed is equally satisfactory whether the iron has been reduced or has merely entered into combination to form a double salt, for example, with the calcium and sulphate ion. It is thus evident that the fundamental role of the reducing agent is to react with ferric iron, and of secondary importance is the fact that the iron may be reduced in the process. In the case of $SO_3^=$ ion which can be readily oxidized by air, it has been found that as a general rule, little of the iron is reduced, and in this case, a double salt will be formed which, as stated above, will comprise the ferric iron, calcium and sulphate ion. Furthermore, the reaction will take place whether the iron is in combination with carbonate or whether it is present as a separate compound. Thus, when ferric hydroxide is added to chemically produced calcium carbonate and the resulting mixture is then treated with the reducing agent, the iron reacts with the reducing agent to form a colorless compound. The term "compound selected from the group consisting of reducing acids and reducing salts capable of reducing ferric iron to ferrous iron" is, therefore, used herein as a term of designation of the group of reagents and, as pointed out, the ferric iron may be or may not be reduced by the compound.

While the action of a reducing agent on ferric iron in acid solution is well known, the reaction of the present invention normally takes place between a substantially insoluble form of iron and the reducing agent; and, therefore, primarily consists of a reaction between a solid suspended in a liquid and a dissolved reducing agent. Furthermore, the formation of the compound involves the reaction between the insoluble iron and the reducing agent in the presence of the insoluble alkaline earth carbonate, and the reaction is, therefore, unique and not of the type previously known and the ferric iron for all practical purposes is not available for reaction in the usual sense.

For the foregoing reasons, special conditions are required to obtain the reaction in accordance with the present invention. Thus, it is necessary that the reducing agent be brought into intimate contact with the alkaline earth carbonate in finely divided, chemically produced form and in the presence of water; that the mixture be subjected to an elevated temperature; and that the mixture be digested for a period of time to convert at least a portion of the ferric iron present into the reaction compound, the time of digestion being dependent upon the temperature employed in the process.

As previously stated, the reaction may take place at moderately elevated temperatures, for example about 140° F. to 212° F., or advantageously at higher temperatures, such as may be obtained by the application of appropriate pressures to the reaction mass. When moderate temperatures are employed, it is necessary, in order to bring about the reaction to an appreciable extent, to digest the mass for an extended time, the length of time depending upon the temperature employed, the activity of the reducing agent, and the amount of ferric iron to be converted. In general, the higher the temperature the shorter will be the time of the reaction; and by subjecting the mixture to elevated temperatures above 212° F. by the use of pressure above atmospheric, the time of reaction may be reduced to a few minutes. If a complete conversion is desired and a relatively weak reducing agent is employed at a relatively low temperature, the digestion may require several days. When the process is carried out at atmospheric pressure, any suitable container which may be heated during the necessary digestion period may be employed.

In one embodiment of the invention, the process involving the reaction between the chemically produced alkaline earth carbonate and the reducing agent is carried out by establishing a pressure on the reaction mass sufficient to raise the temperature appreciably above the boiling point of water. While temperatures corresponding to saturated steam pressures as low as fifteen to twenty pounds per square inch gauge pressure (about 250° F. to 260° F.) or lower may be employed, the use of higher temperatures, for example temperatures corresponding to a saturated steam pressure in excess of one hundred pounds per square inch (about 340° F.) are feasible. Thus, a gauge pressure of several hundred pounds per square inch, for example, two hundred to four hundred pounds (a temperature of about 380° F. to 445° F.) can be employed for satisfactory results. When temperatures corresponding to such pressures are employed, the process is completed in a few minutes, as little as five minutes, depending upon the particular temperature and pressure used. In place of creating the pressure entirely by the generation of steam, all or a portion of the pressure may be provided by the use of a gas such as air. In this case, the temperature will be independent of the steam pressure.

While the use of pressure has been described as one method for carrying out the reaction between the chemically produced carbonate of the reducing agent, it is to be understood that, as stated, in certain instances it may be preferable to employ lower temperatures with entirely satisfactory results, for example by the use of large storage facilities for digesting the chemically produced carbonate material in tanks for a relatively long period of time.

The time reaction is also a function of the amount of ferric iron to be reacted, and for economic reasons or other reasons, it may be desirable to limit the amount of the conversion which takes place. Thus, for a material where maximum whiteness is not required, it is only necessary to subject the mixture to a digestion period for a time sufficient to convert a portion of the discoloring ferric iron to the substantially colorless reaction product. The reaction rate also depends upon the particle size of the carbonate, and with precipitated materials of fine particle size, the reaction proceeds substantially quicker than with larger size materials. In most instances, it is desirable to supply a particle size of less than 20-mesh, and advantageously less than 100-mesh, for example, less than 325-mesh.

The amount of water that is associated with the carbonate does not in any way affect the operation of the process, so long as there is sufficient so that the particles will be exposed to a solution of the reducing agent. Hence, the reaction between the chemically produced carbonate and the reducing agent proceeds entirely satisfactorily in the case of the treatment of a relatively thin suspension of the carbonate in water; for example, a suspension containing 1 part of solids to 5 or 10 or more parts of water by weight. However, where possible, a relatively low concentration of water is advantageously employed because of the lower drying costs, should it be desired that the treated carbonate be obtained in the dry form. In fact, the process will work entirely satisfactorily on pastes with high solid content, for example, 1 part of solids to 1 part of water by weight; and if the whitening agent is properly incorporated, the process will also work on damp or moistened carbonate materials. From the foregoing, it will be apparent that the calcium carbonate sludge obtained as a by-product as previously discussed may be treated directly as it normally contains sufficient water.

Obviously, as has been stated above, the time required for the reaction is preferably adjusted to economic, reasonable limits and, therefore, the material should be as finely divided as possible and the temperature of the reaction vessel should be kept as high as feasible. The actual limits insofar as ultimate fineness of particle size and amount of temperature are concerned again depends on economic factors and in determining the factors to be selected in any particular case, the economics will govern. In fact, as stated, at times the reaction may be advantageously conducted at temperatures as low as about 140° F.

The alkaline earth carbonate that has been treated may be dried in any manner should a dry product be desired. It has been found that the colorless iron compound is in no way affected in drying the material and that the bleached product is completely stable. Therefore, the product may be dried in any desired manner.

In my copending application Serial No. 522,159 filed even date herewith, now abandoned, a process of whitening or bleaching the alkaline earth carbonates is described in which a reagent furnishing an alkaline earth hydroxide is supplied to the alkaline earth carbonate and water. The alkaline earth hydroxide enters into chemical reaction with the ferric iron of the carbonate to provide a substantially white product. The alkaline earth hydroxide may be provided by adding a hydroxide to the mixture or it may be produced in situ by adding any agent capable of yielding an alkaline earth hydroxide when in contact with the alkaline earth carbonate under the conditions of treatment either through chemical reaction with the alkaline earth carbonate, water or other agents or through self-decomposition. Thus, magnesium bicarbonate associated with the calcium carbonate in the sludge obtained in the Pattinson or similar process, hereinabove referred to, will serve as a bleaching or whitening agent under the conditions of reaction.

In accordance with the present invention, a reducing agent is present at the time of the bleaching or whitening of the alkaline earth carbonate, but it is to be understood that the process of the present invention may be conducted in the presence of an alkaline earth hydroxide either added to the mixture or formed in situ and that, in carrying out the process, the whitening or bleaching action may be due in part to the presence of both the reducing agent and the alkaline earth hydroxide; for example, if a calcium sulphite product containing lime is employed, the calcium sulphite is the reducing agent and the calcium hydroxide provides the alkaline earth hydroxide referred to above. Similarly, when a reducing agent is added to a sludge containing magnesium bicarbonate, not only will there be a reducing agent present, but the magnesium bicarbonate may provide an alkaline earth hydroxide by reaction under the conditions of treatment.

The conditions of reaction hereinabove recited in describing the use of the reducing agent alone are applicable when an alkaline earth hydroxide is also supplied, and the amount of hydroxide supplied is not material and may be within the range given above for the reducing agent or it may be smaller or larger than the amount of reducing agent that is employed.

It is to be understood that the type of reaction vessel employed is subject to wide variation and the process may either be batch or continuous. In addition, in the case of carbonates of larger particle size, it is possible to concurrently grind the material in the reaction vessel, for example, by means of steel balls or flint pebbles, and to convert the ferric iron into the colorless compound by maintaining the reaction temperature at a point which will permit the desired conversion to take place in the time allotted to the grinding cycle.

The following examples are illustrative of the present invention wherein the ferric iron of a discolored alkaline earth carbonate is converted to a colorless reaction product.

*Example 1*

A slurry, composed of 100 grams of chemically produced calcium carbonate having a yellowish cast due to the presence of ferric iron, 400 cc. of water, and 0.2 gram of sulphur dioxide added in the form of an aqueous solution of sulphur dioxide gas, is placed in a small pressure autoclave, and external heat is applied so that a pressure of 20 pounds per square inch gauge pressure is maintained for a period of two hours. At the end of this time, the steam is vented off to lower the pressure to atmospheric. A substantially white calcium carbonate is formed.

*Example 2*

A slurry containing 330 grams of the waste calcium carbonate sludge of the Pattinson process having a yellowish cast due to the presence of ferric iron and containing 70% water, 0.2 gram of $SO_2$ added in the form of an aqueous solution of sulphur dioxide gas and 170 c. c. of water is placed in a small pressure autoclave, and external heat is applied so that a pressure of 200 pounds per square inch gauge pressure is maintained for a period of fifteen minutes. At the end of this time, the steam is vented off in order to lower the pressure to atmospheric. A substantially white calcium carbonate is formed.

*Example 3*

A slurry, composed of 100 grams of barium carbonate having a yellowish cast due to the presence of ferric iron, which carbonate is chemically produced by the calcination, hydration, and carbonation of witherite, 400 c. c. of water, and 0.2 gram of sulphur dioxide added in the form of an aqueous solution of sulphur dioxide gas, is placed in a small pressure autoclave and external heat is supplied so that a pressure of 200 pounds per square inch gauge pressure is maintained for a period of fifteen minutes. At the end of this time, the steam is vented off in order to lower the pressure to atmospheric. A substantially white barium carbonate is formed.

*Example 4*

A slurry, composed of 100 grams of precipitated calcium carbonate having a yellowish cast due to the presence of ferric iron, 400 c. c. of water, and 0.2 gram of sulphur dioxide added in the form of an aqueous solution of sulphur dioxide gas, is placed in a small vessel and externally heated so that a temperature of 160° F. is maintained for a period of four hours. At the end of this time, the material is removed from the vessel. A substantially white calcium carbonate is formed.

In the foregoing examples, sulphur dioxide gas may be passed directly into the wet carbonate mass, or an equivalent amount of calcium sulphite may be added.

*Example 5*

A slurry, composed of 100 grams of precipitated calcium carbonate of a yellowish cast due to the presence of ferric iron, 400 c. c. of water, and 0.2 gram of sodium thiosulphate added by dissolving in the water, is placed in a small pressure autoclave and a steam pressure of 200 pounds per square inch gauge pressure is maintained for a period of fifteen minutes. At the end of this time, the steam is vented off in order to lower the pressure to atmospheric. A substantially white calcium carbonate is formed.

*Example 6*

A slurry, composed of 100 grams of precipitated calcium carbonate of a yellowish cast due to the presence of ferric iron, 400 c. c. of water, and 0.2 gram of sodium cyanide added by dissolving in the water, is placed in a small pressure autoclave and a steam pressure of 200 pounds per square inch gauge pressure is maintained for a period of fifteen minutes. At the end of this time, the steam is vented off in order to lower the pressure to atmospheric. A substantially white calcium carbonate is formed.

Considerable modification is possible in the nature of the discolored alkaline earth carbonate treated, as well as in the conditions of the process, without departing from the essential features of the invention.

I claim:

1. The process of treating a chemically produced substantially water-insoluble carbonate selected from the group consisting of calcium, strontium, barium and magnesium carbonate discolored by ferric iron to form a substantially white product which comprises mixing, with said carbonate in the presence of water, a relatively small amount of a non-color-imparting reducing agent selected from the group consisting of reducing acids and reducing salts and which will convert ferric iron to ferrous iron in a substantially neutral medium; and digesting said mixture at a temperature above about 140° F. whereby enough of said ferric iron present in the carbonate is converted into an associating compound of said iron and reducing agent and which association imparts substantially no coloration to the product so that said product is rendered substantially white.

2. The process of claim 1 wherein the chemically produced carbonate treated is calcium carbonate and wherein the reducing agent furnishes $SO_3^=$ ion.

3. The process of claim 1 wherein the chemically produced carbonate treated is the calcium carbonate by-product obtained in the separation of magnesia from dolomite.

4. The process of treating a chemically produced substantially water-insoluble carbonate selected from the group consisting of calcium, strontium, barium and magnesium carbonates discolored by ferric iron to form a substantially white product which comprises mixing, with said carbonate in the presence of water, a relatively small amount of a non-color-imparting inorganic reducing agent selected from the group consisting of reducing acids and reducing salts and which will convert ferric iron to ferrous iron in a substantially neutral medium; and subjecting and maintaining said mixture at an elevated temperature above 212° F. under a pressure above atmospheric whereby enough of said ferric iron present in the carbonate is converted into an associating compound of said iron and reducing agent and which association imparts substantially no coloration to the product so that said product is rendered substantially white.

5. The process of claim 4 wherein the chemically produced carbonate treated is calcium carbonate and wherein the reducing agent furnishes $SO_3^=$ ion.

6. The process of treating a chemically produced substantially water-insoluble carbonate selected from the group consisting of calcium, strontium, barium and magnesium carbonate discolored by ferric iron to form a substantially white product which comprises mixing, with said carbonate in the presence of water, a relatively small amount of a non-color-imparting inorganic reducing agent selected from the group consisting of reducing acids and reducing salts and which will convert ferric iron to ferrous iron in a substantially neutral medium; and subjecting and maintaining said mixture at an elevated temperature of at least 250° F. under a pressure above atmospheric, whereby enough of said ferric iron present in the carbonate is converted into an association compound of said iron and reducing agent and which association imparts substantially no coloration to the product so that said product is rendered substantially white.

7. The process of claim 6 wherein the chemically produced carbonate treated is calcium carbonate and wherein the reducing agent furnishes $SO_3^=$ ion.

8. The process of treating a chemically produced substantially water-insoluble carbonate selected from the group consisting of calcium, strontium, barium and magnesium carbonate discolored by ferric iron to form a substantially white product which comprises mixing, with said carbonate in the presence of water, a relatively small amount of a non-color-imparting inorganic reducing agent selected from the group consisting of reducing acids and reducing salts and which will convert ferric iron to ferrous iron in a substantially neutral medium; and subjecting and maintaining said mixture at a saturated steam pressure between about 200 and about 400 pounds per square inch and a temperature corresponding to the pressure employed whereby enough of said ferric iron present in the carbonate is converted into an associating compound of said iron and reducing agent and which association imparts substantially no coloration to the product so that said product is rendered substantially white.

9. The process of claim 8 wherein the chemically produced carbonate treated is calcium carbonate and wherein the reducing agent furnishes $SO_3^=$ ion.

10. The process of treating a native carbonate selected from the group consisting of calcium, strontium, barium and magnesium carbonates discolored by ferric iron to form a substantially white carbonate product therefrom which comprises calcining said carbonate, hydrating and carbonating said calcined product to form a substantially water-insoluble carbonate; mixing, with said chemically produced carbonate in the presence of water, a relatively small amount of a non-color-imparting reducing agent selected from the group consisting of reducing acids and reducing salts and which will convert ferric iron to ferrous iron in a substantially neutral medium; and digesting said mixture at a temperature above about 140° F. whereby enough of said ferric iron present in the carbonate is converted into an associating compound of said iron and reducing agent and which association imparts substantially no coloration to the product so that said product is rendered substantially white.

11. The process of treating a native carbonate selected from the group consisting of calcium, strontium, barium, and magnesium carbonates discolored by ferric iron to form a substantially white carbonate product therefrom which comprises calcining said carbonate; hydrating and carbonating said calcined product to form a substantially water-insoluble carbonate; mixing, with said chemically produced carbonate in the presence of water, a relatively small amount of a non-color-imparting inorganic reducing agent selected from the group consisting of reducing acids and reducing salts and which will convert ferric iron to ferrous iron in a substantially neutral medium; and subjecting and maintaining said mixture in a closed chamber at an elevated temperature of at least 250° F. under a pressure above atmospheric whereby enough of said ferric iron present in the carbonate is converted into an associating compound of said iron and reducing agent and which association imparts substantially no coloration to the product so that said product is rendered substantially white.

12. The process of obtaining a substantially white carbonate selected from the group consisting of calcium, strontium, barium, and magnesium carbonates from a hydrate thereof discolored by ferric iron which comprises carbonating said hydrate to form a substantially water-insoluble carbonate; mixing, with the chemically produced carbonate so formed in the presence of water, a relatively small amount of a non-color-imparting reducing agent selected from the group consisting of reducing acids and reducing salts and which will convert ferric iron to ferrous iron in a substantially neutral medium; and digesting said mixture at a temperature above about 140° F. whereby enough of said ferric iron present in the carbonate is converted into an associating compound of said iron and reducing agent and which association imparts substantially no coloration to the product so that said product is rendered substantially white.

13. The process of obtaining a substantially white carbonate selected from the group consisting of calcium, strontium, barium, and magnesium carbonates from a hydrate thereof discolored by ferric iron which comprises carbonating said hydrate to form a substantially water-insoluble carbonate; mixing, with said chemically produced carbonate in the presence of water, a relatively small amount of a non-color-imparting inorganic reducing agent selected from the group consisting of reducing acids and reducing salts and which will convert ferric iron to ferrous iron in a substantially neutral medium; and subjecting and maintaining said mixture in a closed chamber at an elevated temperature of at least 250° F. under a pressure above atmospheric whereby enough of said ferric iron present in the carbonate is converted into an associating compound of said iron and reducing agent which association imparts substantially no coloration to the product so that said product is rendered substantially white.

14. The process of treating a chemically produced substantially water-insoluble carbonate selected from the group consisting of calcium, strontium, barium and magnesium carbonates discolored by ferric iron to form a substantially white product which comprises mixing, with said carbonate in the presence of water, a relatively small amount of a non-color-imparting reducing agent selected from a group consisting of reducing acids and reducing salts and which will convert ferric iron to ferrous iron in a substantially neutral medium and a reagent supplying a hydroxide selected from the group consisting of calcium, strontium, barium and magnesium hydroxides; and digesting said mixture at a temperature above about 140° F. whereby enough of said ferric iron present in the carbonate is converted into an associating compound of said iron and reducing agent and which association imparts substantially no coloration to the product so that said product is rendered substantially white.

15. The process of treating a chemically produced substantially water-insoluble carbonate selected from the group consisting of calcium, strontium, barium, and magnesium carbonates discolored by ferric iron to form a substantially white product which comprises mixing, with said carbonate in the presence of water, a relatively small amount of a non-color-imparting reducing agent selected from a group consisting of reducing acids and reducing salts and which will convert ferric iron to ferrous iron in a substantially neutral medium and a reagent supplying a hydroxide selected from the group consisting of calcium, strontium, barium and magnesium hydroxides; and subjecting and maintaining said mixture at an elevated temperature above 212° F. under a pressure above atmospheric whereby enough of said ferric iron present in the carbonate is converted into an associating compound of said iron and reducing agent and which association imparts substantially no coloration to the product so that said product is rendered substantially white.

16. The process of treating a chemically produced calcium carbonate sludge discolored by ferric iron and having magnesium bicarbonate associated therewith to form a substantially white product which comprises mixing, with said sludge, a relatively small amount of a non-color-imparting reducing agent selected from a group consisting of reducing acids and reducing salts and which will convert ferric iron to ferrous iron in a substantially neutral medium; and digesting said mixture at a temperature above about 140° F. whereby enough of said ferric iron present in the carbonate is converted into an associating compound of said iron and reducing agent and which association imparts substantially no coloration to the product so that said product is rendered substantially white.

17. The process of treating a chemically produced calcium carbonate sludge discolored by ferric iron and having magnesium bicarbonate associated therewith to form a substantially white product which comprises mixing, with said sludge, a relatively small amount of a non-color-imparting reducing agent selected from a group consisting of reducing acids and reducing salts and which will convert ferric iron to ferrous iron in a substantially neutral medium; and subjecting and maintaining said mixture at an elevated temperature above 212° F. under a pressure above atmospheric whereby enough of said ferric iron present in the carbonate is converted into an associating compound of said iron and reducing agent and which association imparts substantially no coloration to the product so that said product is rendered substantially white.

LEONARD JOHN MINNICK.

REFERENCES CITED

The following references are of record in the file of this patent:

UNITED STATES PATENTS

| Number | Name | Date |
|---|---|---|
| 233,916 | Bihn et al. | Nov. 2, 1880 |
| 1,994,271 | Church et al. | Mar. 12, 1935 |
| 2,012,854 | Hill | Aug. 27, 1935 |
| 2,013,401 | Booth | Sept. 3, 1935 |
| 2,191,467 | Haywood | Feb. 27, 1940 |
| 2,235,531 | Plumstead | Mar. 18, 1941 |

FOREIGN PATENTS

| Number | Country | Date |
|---|---|---|
| 331,584 | Great Britain | July 7, 1930 |

OTHER REFERENCES

Mellor: "Treatise on Inor. and Theor. Chem.," vol. 3, p. 841 and vol. 10, p. 312, Longmans, Green and Co., N. Y.